(12) United States Patent
Nash, Jr.

(10) Patent No.: US 7,287,395 B2
(45) Date of Patent: Oct. 30, 2007

(54) DISTRIBUTED COOLING SYSTEM

(75) Inventor: Robert V. Nash, Jr., Niles, MI (US)

(73) Assignee: Emerson Climate Technologies, Inc., Sidney, OH (US)

(*) Notice: Subject to any disclaimer, the term of this patent is extended or adjusted under 35 U.S.C. 154(b) by 32 days.

(21) Appl. No.: 11/079,519

(22) Filed: Mar. 14, 2005

(65) Prior Publication Data

US 2005/0210901 A1    Sep. 29, 2005

Related U.S. Application Data

(60) Provisional application No. 60/553,056, filed on Mar. 15, 2004.

(51) Int. Cl.
F25B 1/00 (2006.01)
F25B 7/00 (2006.01)
F25B 49/00 (2006.01)

(52) U.S. Cl. .................. 62/175; 62/183; 62/196.2; 62/228.3; 62/228.5; 62/510

(58) Field of Classification Search ................ 62/175, 62/181, 183, 228.1, 228.3, 228.4, 228.5, 62/510, 196.2
See application file for complete search history.

(56) References Cited

U.S. PATENT DOCUMENTS

| | | | | |
|---|---|---|---|---|
| 4,803,848 A * | 2/1989 | LaBrecque | .................. | 62/183 |
| 4,919,327 A * | 4/1990 | Elluin et al. | ................ | 236/49.1 |
| 5,050,397 A * | 9/1991 | Sugiyama et al. | ............ | 62/175 |
| 5,797,729 A * | 8/1998 | Rafuse et al. | .................. | 417/3 |
| 6,330,804 B1 * | 12/2001 | Uno et al. | .................... | 62/175 |
| 6,487,869 B1 * | 12/2002 | Sulc et al. | .................... | 62/230 |
| 6,722,143 B2 * | 4/2004 | Moon et al. | .................. | 62/175 |
| 6,722,156 B2 * | 4/2004 | Tanimoto et al. | ............. | 62/510 |
| 6,962,058 B2 * | 11/2005 | Kim et al. | ..................... | 62/175 |
| 2001/0007194 A1 * | 7/2001 | Kimura et al. | ............. | 62/228.3 |
| 2003/0010047 A1 * | 1/2003 | Shimoda | .................... | 62/228.3 |

* cited by examiner

*Primary Examiner*—Marc Norman
(74) *Attorney, Agent, or Firm*—Harness, Dickey & Pierce, P.L.C.

(57) ABSTRACT

A system includes a plurality of distributed refrigeration units respectively coupled to discrete refrigeration circuits. Each refrigeration unit may include a variable compressor, a fixed compressor, a condensing unit, and a controller. The controller compares an operating condition of the refrigeration unit to a refrigeration circuit set point to select a compressor staging capable of achieving the refrigeration circuit set point.

35 Claims, 6 Drawing Sheets

DISTRIBUTED COOLING SYSTEM

CROSS-REFERENCE TO RELATED APPLICATIONS

This application claims the benefit of U.S. Provisional Application No. 60/553,056, filed on Mar. 15, 2004. The disclosure of the above application is incorporated herein by reference.

FIELD

The present teachings relate generally to cooling systems and, more specifically, to cooling system architecture and control.

BACKGROUND

Figure 1:
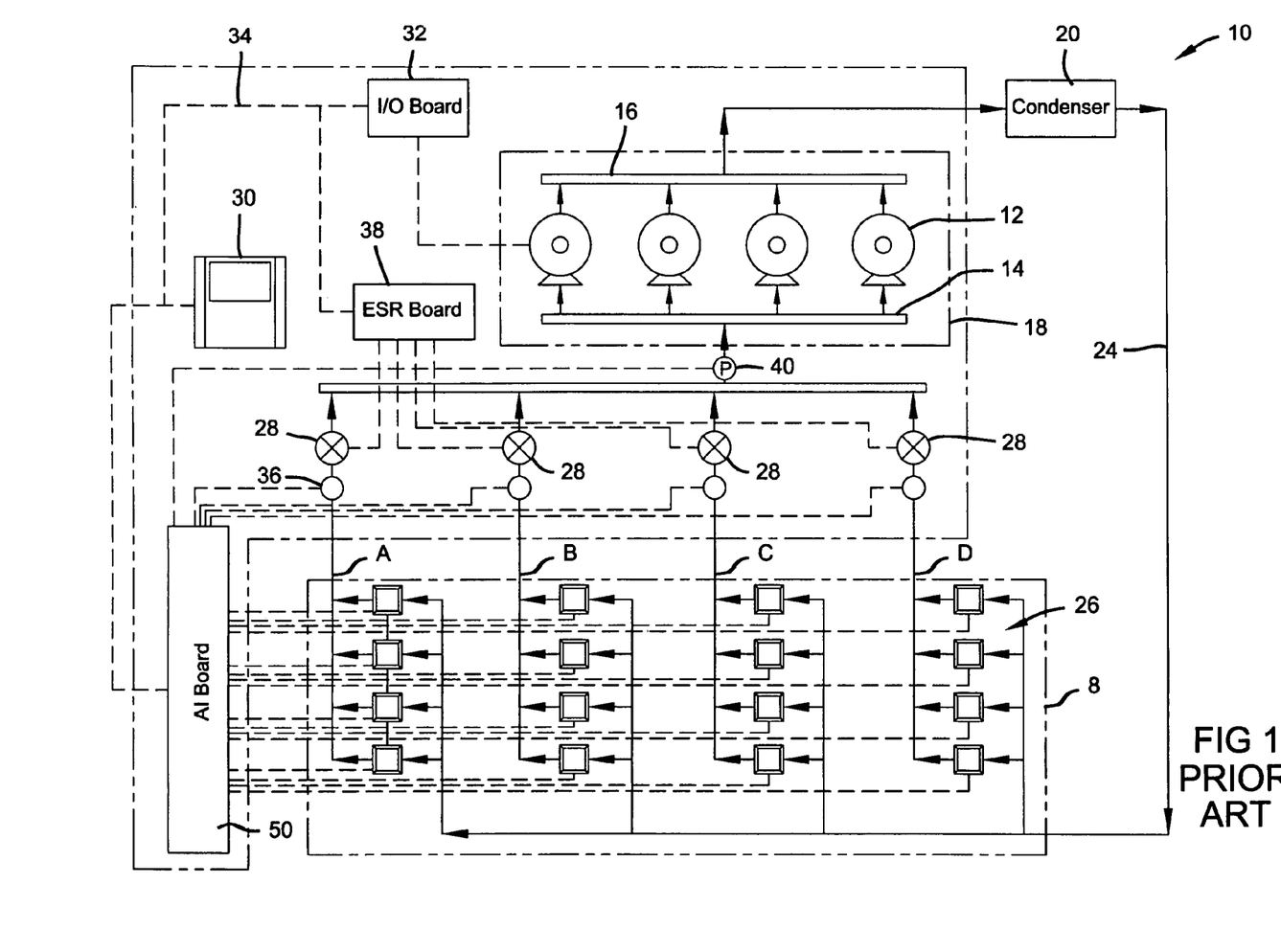
FIG. 1 is a schematic of a prior art refrigeration system.

Referring to FIG. 1, a block diagram of a conventional refrigeration system 10 employing a central plant architecture, which generally includes a plurality of compressors 12 piped together in an equipment room 6 with a common suction manifold 14 and a discharge header 16 all positioned within a compressor rack 18. The compressor rack 18 compresses refrigerant vapor that is delivered to an outdoor condenser 20 where the refrigerant vapor is liquefied at high pressure. This high-pressure liquid refrigerant is delivered to a plurality of refrigeration cases 22 in a floor space 8 by way of piping 24.

Each refrigeration case 22 is arranged in separate circuits 26 consisting of a plurality of refrigeration cases 22 that operate within a similar temperature range. FIG. 1 illustrates four (4) circuits 26 labeled circuit A, circuit B, circuit C and circuit D. Each circuit 26 is shown consisting of four (4) refrigeration cases 22. Those skilled in the art, however, will recognize that any number of circuits 26 within a refrigeration system 10, as well as any number of refrigeration cases 22 may be employed within a circuit 26. As indicated, each circuit 26 will generally operate within a certain temperature range. For example, circuit A may be for frozen food, circuit B may be for dairy, circuit C may be for meat, etc.

Because the temperature requirement is specific to each circuit 26 but each of the circuits is supplied cooling capacity by a central source, a pressure regulator 28 for each circuit 26 acts to control the evaporator pressure and, hence, the temperature range of the circuit, as dictated by the type of refrigeration cases 22. Typically, each refrigeration case 22 includes an evaporator and expansion valve (not shown), which may be either a mechanical or an electronic valve for controlling the superheat of the refrigerant and thus the temperature of the refrigeration case.

Figure 2:
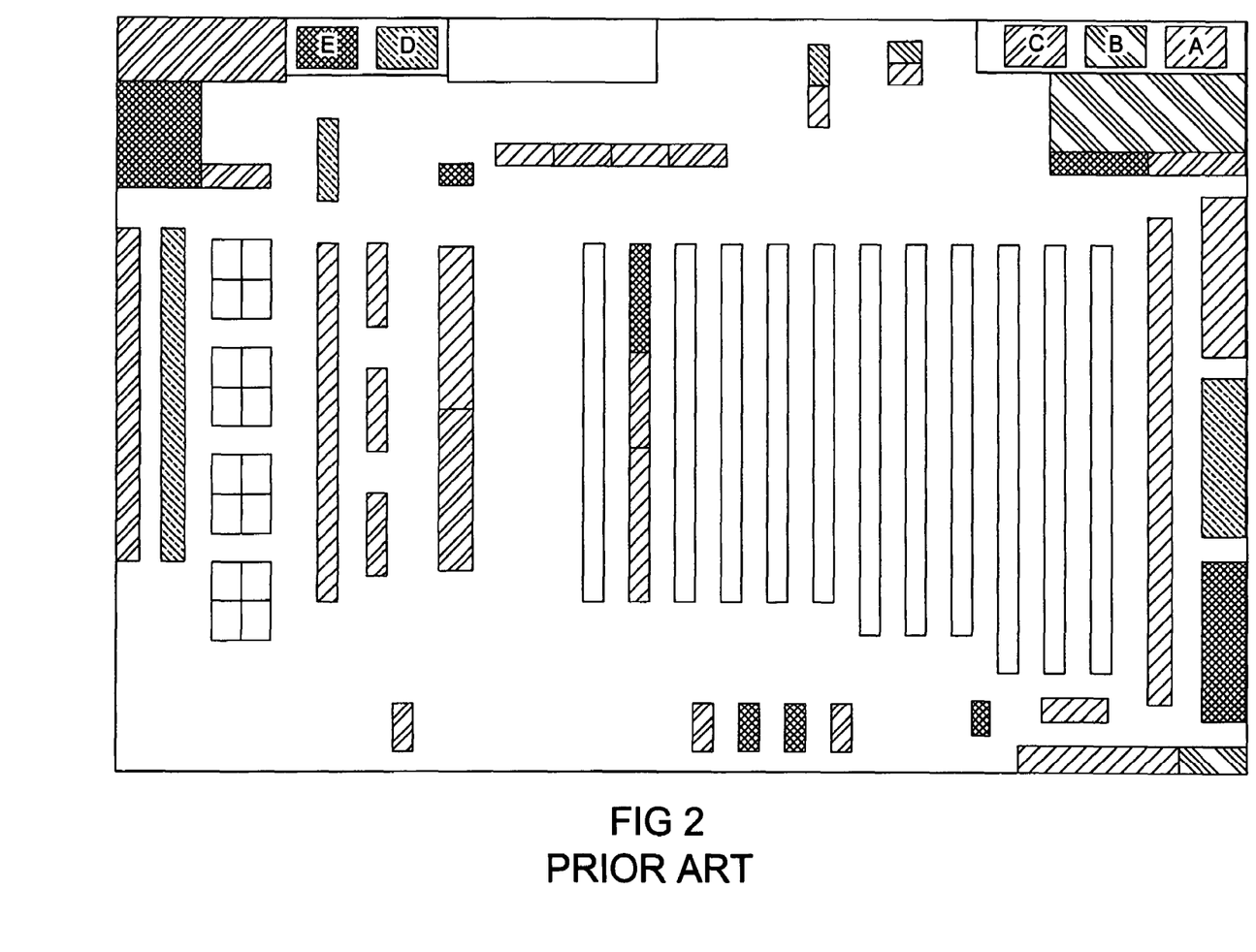
FIG. 2 is another schematic of a prior art refrigeration system.

The conventional central plant architecture for a cooling system positions the compressor rack or multiple compressor racks in designated space of a building, perhaps in the equipment room, basement or a rooftop penthouse. In each scenario, the system requires extensive suction and liquid piping throughout the building to feed the refrigeration cases, coolers and/or air conditioning systems. As best illustrated in FIG. 2, liquid and suction piping for each compressor rack A-E must be piped to the associated refrigerated cases 22 in its circuit (as indicated by cross-hatching), often requiring piping to cross the entire building and return. Further, the circuit includes a condenser, which is typically positioned outside the building and requires extensive piping to feed the refrigeration cases, coolers and/or air conditioning systems.

Conventional central plant architecture requires an extensive piping network with suction and liquid piping traversing throughout the store to feed cases, coolers and air conditioning units, which then all run back to a common point, i.e., a suction header for one or more compressor racks. Because of the extensive piping, conventional coding systems require an extensive amount of refrigerant to simply fill the pipes. In addition to the cost of additional refrigerant, the extensive piping network presents a greater opportunity for refrigeration leaks and heat loss, requiring sensors and insulation. Further, the cost and complexity of field piping condensers is significant, as is the physical space required for the central plant or the structural steel to accommodate large central rooftop penthouses.

The communication and power supply network is also extensive as a result of the central plant architecture. With reference to FIG. 1, communication and control wiring for each refrigeration case 22, pressure regulator 28, and sensors 36, 40 are supplied to an analog input board 50 or are received from an input/output board 32 or a driver board 38 to optimize cooling system performance. This extensive network of wires is expensive to design and install. In fact, much of the wiring results from design limitations imposed by the central plant architecture which places the main refrigeration controller 30, input/output module 32, and ESR board 42 in a compressor room 6 and daisy chained via a communication bus 34 to facilitate the exchange of data between them.

For example, to control the various functions of the refrigeration system 10, a main refrigeration controller 30 controls the operation of each pressure regulator 28, as well as the suction pressure set point for the entire compressor rack 18. The refrigeration controller 30 controls the bank of compressors 12 in the compressor rack 18 through the input/output board 32, which includes relay switches to turn the compressors 12 on and off to provide the desired suction pressure. A separate case controller may be used to control the superheat of the refrigerant to each refrigeration case 22 through an electronic expansion valve in each refrigeration case 22 by way of a communication network or bus.

Further, in order to monitor the suction pressure for the compressor rack 18, a pressure transducer 40 may be positioned at the input of the compressor rack 18 or just past the pressure regulators 28. The pressure transducer 40 delivers an analog signal to an analog input board 38, which measures the analog signal and delivers this information to the main refrigeration controller 30, via the communication bus 34. Also, to vary the openings in each pressure regulator 28, the driver board 38 drives up to eight (8) pressure regulators 28. The driver board 38 includes eight (8) drivers capable of driving the pressure regulators 28 via control from the main refrigeration controller 30.

The central plant architecture is particularly inefficient as a result of the compressor rack 18 supplying high-pressure liquid refrigerant to multiple refrigeration circuits operating at different temperatures. With reference again to FIG. 1, the suction pressure at the compressor rack 18 is dependent on the temperature requirement for each circuit 26. For example, assume circuit A operates at 10° F., circuit B operates at 15° F., circuit C operates at 20° F., and circuit D operates at 25° F. The suction pressure at the compressor rack 18, which is sensed through the pressure transducer 40, requires a suction pressure set point based on the lowest temperature requirement for all the circuits 26, which, for this example, is circuit A, or the lead circuit. Therefore, the suction pressure at the compressor rack 18 is set to achieve a 10° F. operating temperature for circuit A, which is able to operate most efficiently with a nearly one hundred percent open pressure regulator 28. Because each circuit 26 is operating at a different temperature, however, the pressure regulators 28 in circuits B, C and D are closed a certain percentage for each circuit 26 to control the corresponding temperature for that particular circuit 26 and costing efficiency. To raise the temperature to 15° F. for circuit B, the stepper regulator valve 28 in circuit B is closed slightly, the valve 28 in circuit C is closed further, and the valve 28 in circuit D is closed even further providing for the various required temperatures. As a result, the central plant architecture dictates certain inherent operative inefficiencies.

SUMMARY

A system includes a plurality of discrete refrigeration units respectively coupled to independent refrigeration circuits, with each of the individual refrigeration circuits operating in a different temperature range from another of the independent refrigeration circuits. Each of the discrete refrigeration units includes at least one compressor fluidly coupled to a suction manifold and fluidly coupled to a discharge manifold. Each of the plurality of discrete refrigeration units includes a controller to stage the at least one compressor based on a comparison of an operating condition of a respective independent refrigeration circuit to a refrigeration circuit set point.

A system includes a first refrigeration unit including a first variable capacity compressor and a first fixed capacity compressor fluidly coupled to a first suction manifold and fluidly coupled to a first discharge manifold. The first suction manifold and first discharge manifold are coupled to a first refrigeration circuit operating within a first temperature range. A first controller is associated with the first refrigeration unit to stage the first variable capacity compressor and the first fixed capacity compressor based on a comparison of a first operating condition of the first refrigeration unit to a first refrigeration circuit set point. A second refrigeration unit includes a second variable capacity compressor and a second fixed capacity compressor fluidly coupled to a second suction manifold and fluidly coupled to a second discharge manifold. The second suction manifold and the second discharge manifold are coupled to a second refrigeration circuit separate from the first refrigeration circuit and operate within a second temperature range different than the first temperature range. A second controller is associated with the second refrigeration unit to stage the second variable capacity compressor and the second fixed capacity compressor based on a comparison of a second operating condition of the second refrigeration unit to a second refrigeration circuit set point.

A refrigeration unit for a refrigeration circuit in a refrigeration system including multiple refrigeration circuits includes a housing, at least one variable compressor disposed within the housing, and at least one fixed compressor disposed within the housing. A suction manifold is disposed within the housing and is fluidly coupled to the at least one variable compressor and to the at least one fixed compressor. A discharge manifold is fluidly disposed within the housing and is coupled to the at least one variable compressor and to the at least one fixed compressor. A condenser unit is disposed within the housing, and a controller is mounted to the housing and stages the at least one variable capacity compressor and the at least one fixed capacity compressor based on a comparison of an operating condition to a set point.

A method includes selecting a first set point for a first refrigeration circuit coupled to a first refrigeration unit having a first variable capacity compressor and a first fixed capacity compressor. The method also includes detecting a first operating condition of the first refrigeration circuit, comparing the first operating condition to the first set point, and staging the first variable capacity compressor and the first fixed capacity compressor based on the comparison. In addition, the method includes selecting a second set point for a second refrigeration circuit coupled to a second refrigeration unit having a second variable capacity compressor and a second fixed capacity compressor. The method further includes detecting a second operating condition of the second refrigeration circuit, comparing the second operating condition to the second set point, and staging the second variable capacity compressor and the second fixed capacity compressor based on the comparison.

Further areas of applicability of the present teachings will become apparent from the detailed description provided hereinafter. It should be understood that the detailed description and specific examples, while indicating the preferred embodiment of the teachings, are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION

The following description is merely exemplary in nature and is in no way intended to limit the teachings, application, or uses.

Figure 3:
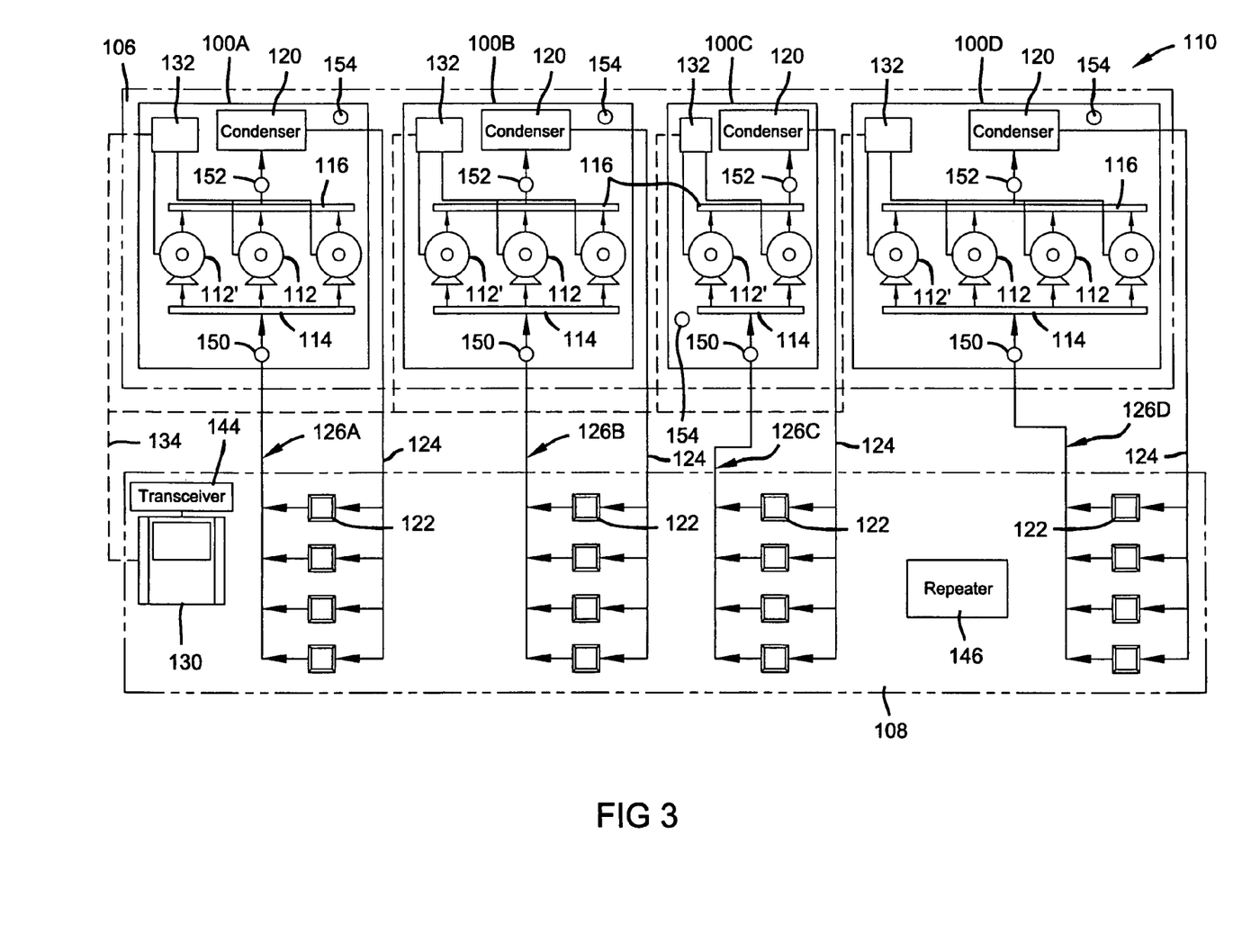
FIG. 3 is a schematic of a refrigeration system according to the teachings.

Referring to FIG. 3, a refrigeration system 110 according to the teachings includes a plurality of distributed refrigeration units 100A-D, each respectively piped to a discrete refrigeration circuit 126A-D. Each distributed refrigeration unit 100 includes a plurality of compressors 112, a condensing unit 120 and a controller 132, collectively mounted to or on a housing of the distributed refrigeration unit 100. The compressors 112 are piped together with a common suction manifold 114 and a discharge header 116 to provide compressed refrigerant to the condensing unit 120, where the refrigerant vapor is liquefied at high pressure. Piping 124 for each refrigeration circuit 126A-D delivers the high pressure liquid refrigerant to a plurality of refrigeration cases in a retail outlet floor space 108. The distributed refrigeration units 100 may be disposed at an outdoor space 106, such as on a rooftop or adjacent the building housing the retail outlet floor space 108.

Each refrigeration case 122 is arranged in a discrete refrigeration circuit 126 including a plurality of refrigeration cases 122 operating within a similar temperature range and connected by piping 124 to a respective distributed refrigeration unit 100. FIG. 3 illustrates four circuits 126 labeled circuit 126A, circuit 126B, circuit 126C and circuit 126D. Each circuit 126 is shown to include four refrigeration cases 122, but those skilled in the art will recognize that refrigeration system 110 may include any number of circuits 126, and each circuit 126 may include any number of refrigeration cases 122. Each circuit 126 will be associated with its own refrigeration unit 100 and generally operate within a temperature range dictated by the cooling demand. For example, circuit 126A may be for frozen food, circuit 126B may be for dairy, circuit 126C may be for meat, etc. Because the temperature requirement is different for each circuit 126, each is independently piped to a distributed refrigeration unit 100 via piping 124. For example, circuit 126A is plumbed to distributed refrigeration unit 100A; likewise for circuit 126B and distributed refrigeration unit 100B, etc.

By distributing the capacity to deliver high-pressure liquid refrigerant, and independently piping each circuit 126 to operate within a certain temperature range, certain efficiencies are gained and expenses avoided. For example, unlike a conventional refrigeration system 10, there is no need for a pressure regulator 28 to control the evaporator pressure and, hence, the temperature of the refrigerated space in the refrigeration cases 22. Further, due to the distributed arrangement of the refrigeration units 100, the condensing units 120 and controllers 132 are installed integrally with the compressors 112 in the distributed refrigeration unit 100, thereby ensuring piping and wiring to factory specifications.

The distributed arrangement of a single refrigeration circuit 126 per distributed refrigeration unit 100 provides the efficiencies of parallel compressor operation that the central plant architecture provides, but does so with significantly reduced piping and refrigerant requirements. The distributed arrangement also reduces the initial construction costs to the building owner, as well as shortened construction due to the simplified arrangement. Over the life of the system, it reduces energy consumption and refrigeration quantity.

Figure 4:
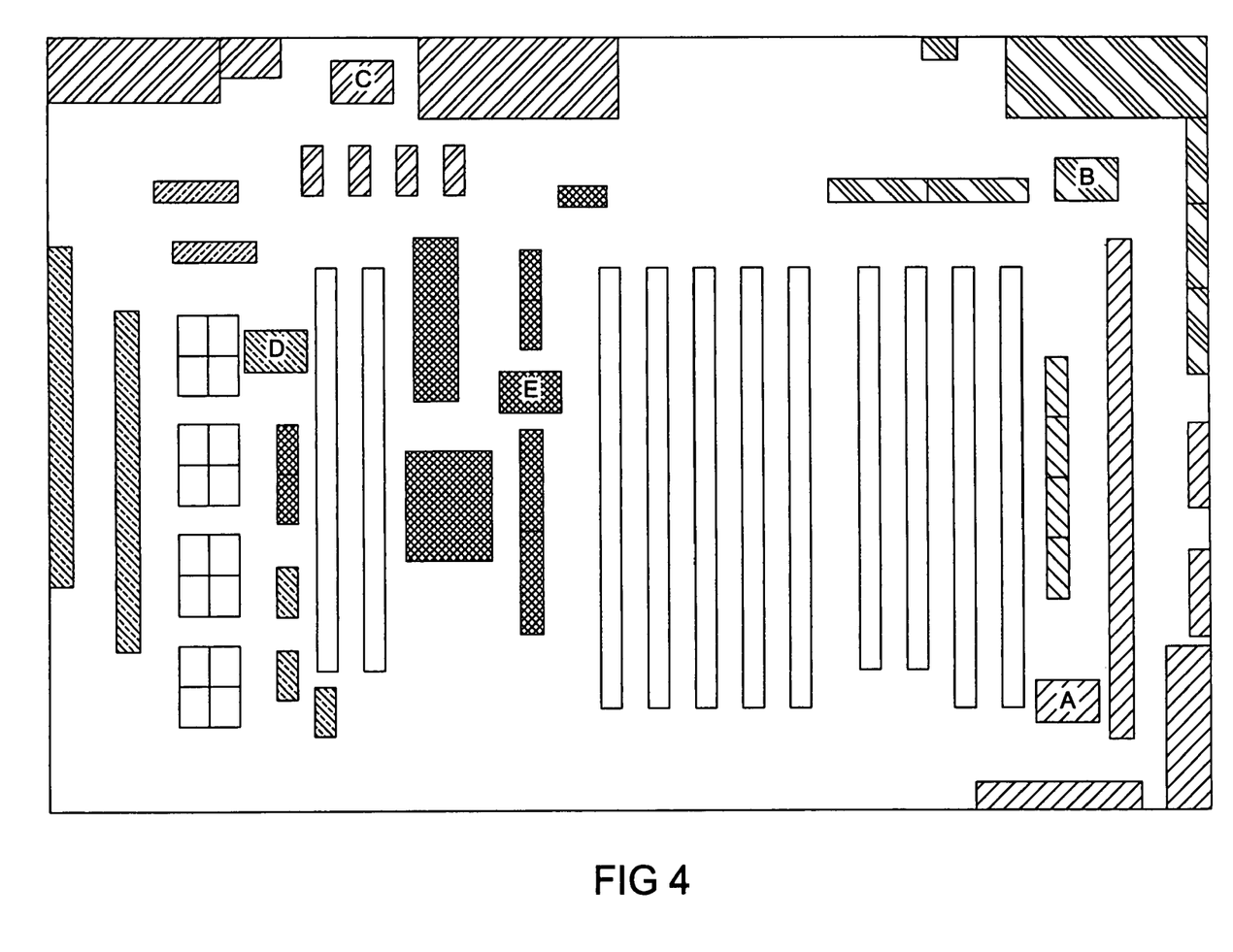
FIG. 4 is another schematic of a refrigeration system according to the teachings.

As illustrated in FIG. 4, by distributing compressor capacity via the distributed refrigeration units 100, shorter runs of piping and wiring are required as the distributed refrigeration units 100 are disposed outside the retail outlet, such as on the retail outlet roof or along an outside wall, at a convenient location near where the refrigeration circuits 126 are disposed within the retail outlet. Further, a distributed arrangement of multiple smaller refrigeration units 100 saves cost over the central plant approach, which often requires a large central penthouse weighing upwards of 40,000 to 50,000 pounds and requiring extensive steel structure to support the weight; or requires significant space within the retail outlet and extensive field piping to condensers mounted on raised steel platforms on the roof of the retail outlet. By comparison, the distributed refrigeration units 100 with integrated compressors 112, condenser 120 and controllers 132, weigh approximately 1,000 to 3,000 pounds, which, once optimally located, will not require additional structure and typically require only increasing girder beam and joist size. Further, the lighter weight allows the distributed refrigeration units 100 to be transported as assembled at the manufacturing facility. Compared to the total additional structural cost of approximately $25,000 per unit for a penthouse for a central plant approach, the additional structural cost of the distributed approach is approximately $700 per unit.

The efficiencies gained by the distributed architecture begin with the construction, which can be accomplished in a shorter period of time as the condensers 120 are piped and wired at a manufacturing facility and the distributed refrigeration units 100 are disposed proximate the refrigeration circuits 126 they serve. This arrangement not only shortens installation time, but reduces the labor costs associated with the piping installation. Further, the cost of the piping (particularly as the cost of copper piping has increased over recent years), hangers and insulation decreases as less is required for the shorter runs between the distributed refrigeration units 100 and the refrigeration circuits 126. Further, because of the shorter runs, there is a lower refrigerant requirement, helping retail outlet owners meet increasingly stringent environmental protection standards. In terms of operating efficiency, reduced suction line pressure loss and greater energy efficiency is achieved as a direct result of the shorter pipe runs and targeted operating temperature provided by the arrangement of the distributed refrigeration unit 100 for each refrigeration circuit 126.

As with a conventional system, high-pressure liquid refrigerant is delivered to each refrigeration case 122 within its respective refrigeration circuit 126. The refrigeration case 122 includes an evaporator (not shown) and expansion valve (not shown), which may either be a mechanical or electronic valve for controlling the superheat of the refrigerant. Refrigerant is delivered by piping 124 to the evaporator in each refrigeration case 122 where the refrigerant passes through the expansion valve, and drops in pressure to change the high pressure liquid refrigerant to a lower pressure combination of liquid and vapor. As the warmer air from the refrigeration case 122 moves across the evaporator coil, the low-pressure liquid returns to a gas, which is delivered to the common suction manifold 114 for the compressors 112 within the distributed refrigeration unit 100. As before, the compressors 112 compress the low pressure gas to a higher pressure and deliver the high-pressure gas to the condenser 120, which again creates a high-pressure liquid to begin the refrigeration cycle again.

Figure 5:
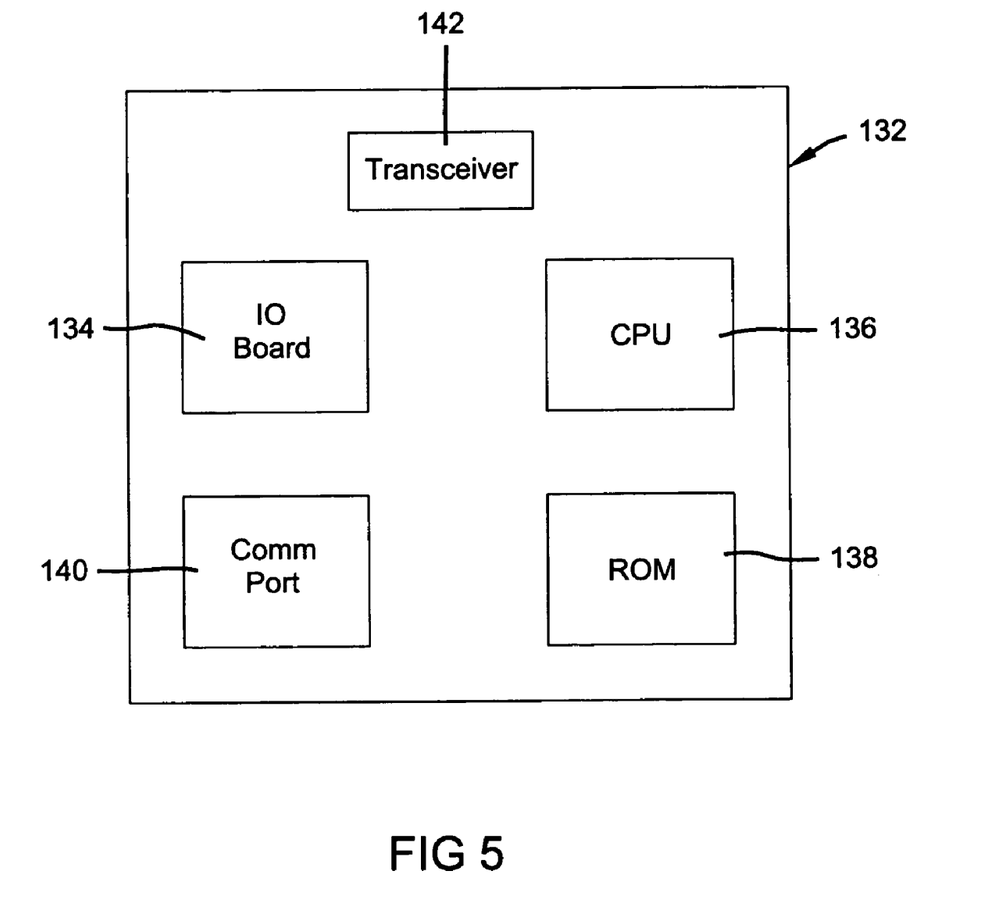
FIG. 5 is a block diagram of a controller according to the teachings.
Figure 6:
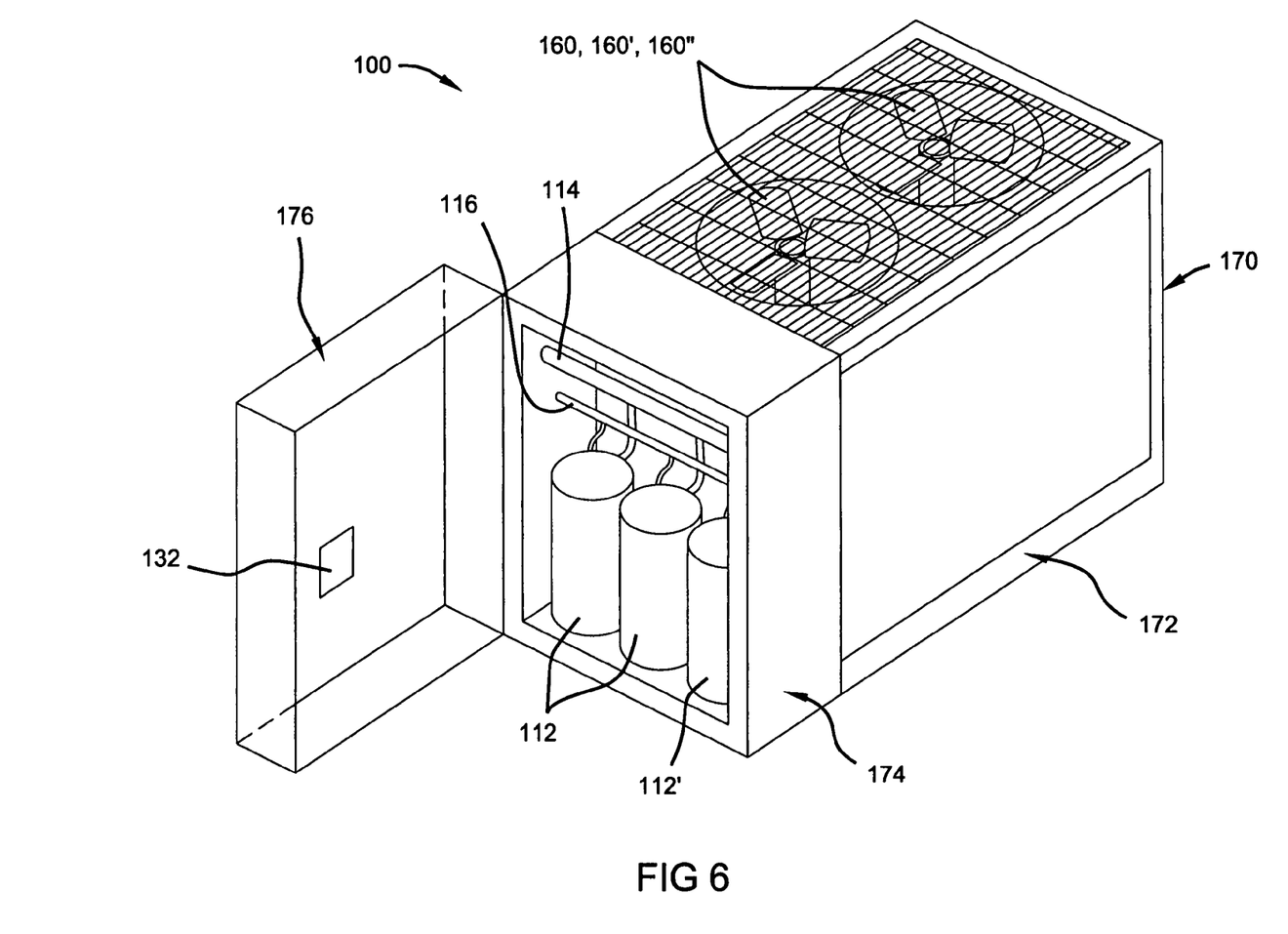
FIG. 6 is a perspective view of a distributed refrigeration unit according to the teachings.

The controller 132 of the distributed refrigeration unit 100 may include an input/output board 134, a microprocessor 136, memory 138, and a communication port 140, as best shown in FIG. 5. The controller 132 may be mounted on the outer housing of the distributed refrigeration unit 100, as best shown in FIG. 6. The controller 132 controls the compressors 112 through the input/output board 134, which includes relay switches to turn the compressors 112 on and off to provide the desired suction pressure, as well as control one or more fans of the condensing unit 120 by turning fan motors off and on, varying fan speed and/or using an inverter on the fan motor. The controller 132 communicates through communication bus 134 via the communication port 140.

The refrigeration system 110 further includes a refrigeration controller 130, which is in communication with the controllers 132 of the various distributed refrigeration units 100. The refrigeration controller 130 may be an Einstein area controller offered by CPC, Inc., of Atlanta, Ga., or any other type of controller that may be programmed.

In one variation of the teachings, the controllers 132 may include operating algorithms stored in memory 138 for compressor capacity and condenser fan control, which programs are executed by the processor 136. The controller 132 then communicates operating status and measured parameter data to the main refrigeration controller 130 via communication port 140, which may be connected to communication bus 134. Such communication is typically wired, but may more efficiently be accomplished using a wireless communication protocol.

In another variation, the refrigeration controller 130 stores algorithms for compressor capacity and condenser fan control, and a processor in the main refrigeration controller 30 executes the programs and communicates control signals to the controller 132 for each distributed refrigeration unit 100. Again, the communication between the main refrigeration controller 130 and the controller 132 for each distributed refrigeration unit 100 may be accomplished over communication bus 134 or through wireless communication protocol.

For wireless communication, each controller 132 may include a transceiver 142 (as shown in FIG. 5) for transmitting and receiving wireless signals. The main refrigeration controller 130 similarly may include a transceiver 144 for transmitting and receiving signals. Each transceiver 142, 144 may include a transmitter and receiver capable of receiving and sending radio frequency (RF) parametric data. Further, each transceiver 142, 144 may include a signal conditioning circuit. The transceiver may be a stand-alone device positioned independently of the controller 132 or refrigeration controller 130. Further, the refrigeration system 110, depending on distance and the communication environment, may require one or more RF repeaters 146 to overcome a limited transmission range. In this case, each repeater 146 acts as a bridge between the transceiver 142 of the controller 132 and the transceiver 144 of the main refrigeration controller 130.

The controller 132 controls distributed refrigeration unit 100 based on set points established within the refrigeration controller 130. Because the controller 132 is configured with a RAM chip, microprocessor, and flash memory, it performs all control functions even when communication to the refrigeration controller 130 is lost. Furthermore, this same configuration allows the controller 132 to download the most recent control set points to the refrigeration controller 130 after communication is re-established. Similar to the refrigeration controller 130, the controller 132 has various memory chips that are pre-programmed with default set points. The controller 132 is capable of operating the associated distributed refrigeration unit 100 as soon as the controller 132 has been wired to the distributed refrigeration unit 100 and is receiving input data. Set points may also be altered at any time from a hand-held terminal and are valid until a connection between the controller 132 and the refrigeration controller 130 is made. The controller 132 monitors input data from sensors connected directly to it, and receives additional input data routed to the refrigeration controller 130 from sensors connected to other controllers or input boards.

Each distributed refrigeration unit 100 includes one or more compressors 112 depending on the required capacity for the refrigeration circuit 126 to which it is piped. Further, each distributed refrigeration unit 100 may include at least one variable capacity compressor 112'. Thus, if the distributed refrigeration unit 100 includes a single compressor 112, it may be a variable capacity compressor 112'. Where the distributed refrigeration unit 100 includes two, three, four or more compressors 112, at least one of the compressors 112 may be a variable capacity compressor 112', but as many as two or all of the compressors 112 may be variable capacity compressors 112'.

Variable capacity compressors 112', such as that disclosed in U.S. Pat. Nos. 4,563,324; 6,120,255; 6,213,731; and 6,821,092, each of which is expressly incorporated herein by reference, allow efficient and accurate matching of compressor output to required circuit capacity. Variable capacity compressors modulate compressor capacity by one or more stepped amounts or infinitely to more efficiently match capacity to load by allowing the compressor to operate at full capacity and one or more reduced capacity modes. Variable capacity compressors include variable speed compressors and compressors having capacity modulation, such as by venting the compression chamber and/or blocking suction.

The controller 132 uses a pressure measurement from a transducer 150 on the suction side of the compressor 112 to compare to a user defined set point. Through a PID comparison of the pressure measurement and the set point, the controller 132 selects compressor staging. The PID output is a capacity percentage needed to achieve the set point.

In order to determine staging based on the percentage capacity required, the controller 132 may employ a capacity control algorithm or a data look-up table. The data look-up table includes, for any given capacity, all possible combinations of compressor staging. Based on a user-selected preference, the controller 132 under either scenario selects a staging for the capacity needed, or moves a predetermined capacity towards the capacity requested so as to minimize cycling of the compressors.

Once the new compressor capacity is selected there are many compressor combinations for satisfying requested capacity. In order to select a capacity, a controller uses the following criteria: (1) minimizing cycling among the compressors; (2) equalizing run time among the compressors; and (3) matching compressor on and off time. The user may select whether equalizing run time or matching on and off time is used in selecting a compressor combination for staging a particular capacity. At a minimum, compressor staging for a given capacity is decided based on minimizing compressor cycling.

Where a variable capacity compressor 112' is included in the suction group, varying the capacity of that compressor 112' may be by default the first option for achieving a given capacity. There are limits, however, because it is not desirable to ramp up the capacity of the compressor too quickly. Thus, within a given time frame, the capacity of variable capacity compressor 112' may only change by a user-defined amount. Thus, once this maximum is reached, the controller 132 may use the capacity control algorithm or data look-up table to complete staging for that given capacity. Also, the capacity of variable capacity compressor 112' may be limited to within a range where that compressor operates most efficiently. For example, limiting the capacity of the variable capacity compressor 112' to between fifty and eighty-five percent of its maximum speed may be desirable. Thus, the controller 132 operates the variable capacity compressor 112' within this range and uses the capacity control algorithm or data look-up table to complete compressor staging for the necessary capacity. In this scenario, the variable capacity compressor 112' cycles within its range to meet small capacity changes.

A pressure control algorithm may be used to control suction pressure input against the suction pressure set point. The result of this control affects compressor outputs, which stage on and off depending on outputs from the PID control. There are two main control strategies for compressor control: (1) normal control; and (2) fixed steps control.

Normal control enables the compressor control algorithm to find the best possible combination of compressors within the suction group and also satisfy any run time and horsepower requirements. The desired percentage attained from the capacity PID algorithm, referred to as a desired percentage, is used to determine the next best combination of compressors. The desired percentage is converted to desired horsepower by multiplying by the total horsepower in the suction group. The process to find the proper combination involves two different algorithms. One algorithm finds combinations for suction groups that have variable capacity compressors and the other for suction groups having only fixed capacity compressors.

When using the data look-up table, two tables are built representing all the possible permutations of compressors 112 and the associated total horsepower for the suction group. Both tables are then sorted from lowest horsepower combination to highest. A capacity find algorithm searches for the combination that matches closest to the desired horsepower, or desired percentage. When the closest match is found, this new combination of compressors 112 is stored and fed into a delay control algorithm. The delay amount is calculated by comparing the new combination to the current combination, and determining whether a compressor 112 or an unloader is to be staged on or off, then picking the largest delay amount amongst the set points. Once the delay is started, the newest combination is stored and the current combination is used until the delay time expires. During the time that the new combination is stored, however, other combinations might be found and saved over the previously-stored one. If a newer combination has a calculated delay amount that is less than the current delay, and the timer has already passed this delay amount, the delay is cancelled and the newer combination is used at the outputs. By using this method, the combination at the outputs always gets the correct amount of delay. Variable capacity compressors 112', however, are not included in calculating delays.

Because variable capacity compressors 112' may be controlled to provide only a percentage of their horsepower, they can be used to fine tune capacity when combined with fixed compressors to find the closest match for the desired percentage. Fixed compressors 112, however, are treated as digital switches. When the compressor 112 is staged on, the output is set to high. With this simple control, as the desired horsepower increases, more compressors 112 in the group are staged on to compensate for the need. A search method is executed to look for a combination within the combination tables. When the closest match is found, the new combination is stored and fed into the delay control algorithm, as explained above.

The fixed steps control strategy gives the user the capability to provide its own combinations for the suction group. For a maximum number of thirty steps, the user can determine what stages should be on or off at every step. A desired percentage is used as the input for determining the next step. Therefore, as the percentage increases, the algorithm will increment to the next step that matches the percentage. The next step value, which represents a combination of stages, is then sent to the delay control algorithm. If the percentage is decreasing, the algorithm will decrement to the previous step. When the current step reaches the first step or the very last step, the algorithm holds until the percentage changes in the opposite direction.

The controller 132 controls fan speed for condensing unit 120 for scheduling, logging, and monitoring. The controller 132 supports three basic cooling strategies: (1) air cooling; (2) evaporation; and (3) temperature difference. For each of these strategies, the controller 132 uses PID control to a user-defined set point to control operation of the fan by turning fan motors off and on, varying fan speed, and/or using an inverter on the fan motor.

For air cooling, multiple fans 160 may be used, in which case they are sequenced based on the cooling required. The sequence can be controlled to equalize run time among the several fans 160. The amount of cooling necessary is determined by comparing the pressure on the discharge side (as measured by transducer 152) of the compressor and the user-defined set point. If a variable speed fan 160' is used, the controller 132 sets the speed of the fan 160' based on the same comparison. If a two-speed fan 160" is used, the controller 132 selects the speed based on the cooling required, as derived from the same comparison.

For evaporative cooling of the condensing unit 120, the controller 132 operates a water valve (not shown) based on the required cooling of a condensing unit 120. Further, the controller 132 operates a fan 160 for evaporation of the cooling water over the condenser coils, and may be further fitted with a damper (no shown), whose opening is varied by the controller 132. Again, to determine the amount of cooling required, a compressor discharge pressure measurement from transducer 152 is compared to a user-defined set point.

For the temperature difference strategy for condensing unit 120, the controller 132 takes the difference between an ambient temperature measurement from ambient temperature sensor 154 and a discharge pressure measurement from transducer 152. The difference is converted to temperature. While the temperatures being compared are different for this approach, cooling is typically air-cooling but could alternatively be evaporative.

With reference to FIG. 6, the distributed refrigeration unit 100 includes a housing lens 170 divided into a condensing unit cabinet 172, a compressor cabinet 174, and an electronic cabinet 176. The condensing unit cabinet 172 houses the condensing unit 120 and condenser fans 160. The compressor cabinet 174 houses one or more compressors 112, 112', as well as the section header 114 and discharge header 116. The electronic cabinet 176 encloses the controller 132 in an enclosure accessible from the exterior of the housing 170. At least one of the compressors 112 may be a variable compressor 112'. Further, while a pair of condenser fans 160 are shown, one or more condenser fans 160 may be provided, and condenser fans 160 may be variable speed condenser fans 160' or two-speed condenser fans 160".

The description of the teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A commercial refrigeration system comprising:
  a first refrigeration unit at a retailer and in communication with a first refrigeration case disposed within a retail space, said first refrigeration unit including a first variable capacity compressor operable between a full capacity mode and a reduced capacity mode and a first fixed capacity compressor operable between a full capacity mode and a zero capacity mode, said first variable capacity compressor and said first fixed capacity compressor being fluidly coupled to a first suction manifold and fluidly coupled to a first discharge manifold, said first suction manifold and said first discharge manifold coupled to a first refrigeration circuit operating within a first temperature range;
  a first controller associated with said first refrigeration unit to stage said first variable capacity compressor and said first fixed capacity compressor based on a comparison of a first operating condition of said first refrigeration unit to a first refrigeration circuit set point;
  a second refrigeration unit at the retailer and in communication with a second refrigeration case disposed within the retail space, said second refrigeration unit including a second variable capacity compressor operable between a full capacity mode and a reduced capacity mode and a second fixed capacity compressor operable between a full capacity mode and a zero capacity mode, said first variable capacity compressor and said first fixed capacity compressor being fluidly coupled to a second suction manifold and fluidly coupled to a second discharge manifold, said second suction manifold and said second discharge manifold coupled to a second refrigeration circuit separate from said first refrigeration circuit and operating within a second temperature range different than said first temperature range; and a second controller associated with said second refrigeration unit to stage said second variable capacity compressor and said second fixed capacity compressor based on a comparison of a second operating condition of said second refrigeration unit to a second refrigeration circuit set point.

2. The system of claim 1, wherein said first operating condition is a first suction pressure and said second operating condition is a second suction pressure.

3. The system of claim 2, wherein said first suction pressure is detected at said first suction manifold and said second suction pressure is detected at said second suction manifold.

4. The system of claim 1, wherein said first controller uses proportional integral control in comparing said first operating condition to said first refrigeration circuit set point and said second controller uses proportional integral control in comparing said second operating condition to said second refrigeration circuit set point.

5. The system of claim 1, wherein said first controller selects compressor staging for said first refrigeration circuit using a compressor control algorithm and said second controller selects compressor staging for said second refrigeration circuit using a compressor control algorithm.

6. The system of claim 1, wherein said first controller selects compressor staging using a first look-up table and said second controller selects compressor staging using a second look-up table.

7. The system of claim 6, wherein said first and second look-up tables each include all possible combinations of compressor staging.

8. The system of claim 1, wherein said first controller modulates a capacity of said first variable capacity compressor to achieve said first refrigeration circuit set point and said second controller modulates said second variable compressor to achieve said second refrigeration circuit set point.

9. The system of claim 8, wherein said first controller selectively toggles said first fixed compressor between a run state and a shutdown state to achieve said first refrigeration circuit set point and said second controller selectively toggles said second fixed compressor between a run state and a shutdown state to achieve said second refrigeration circuit set point.

10. The system of claim 1, wherein said first refrigeration unit includes a first condensing unit having a first condenser coil and a first condenser fan and said second refrigeration unit includes a second condensing unit having a second condenser coil and a second condenser fan.

11. The system of claim 10, wherein said first controller is operable to control said first condenser fan based on said first refrigeration circuit set point and said second controller is operable to control said second condenser fan based on said second refrigeration circuit set point.

12. The system of claim 1, wherein said first controller is in communication with a system controller and said second controller is in communication with a system controller.

13. A method comprising:

selecting a first set point for a first refrigeration circuit of a commercial refrigeration system at a retailer, the first refrigeration circuit including a first refrigeration case in a retail space coupled to a first refrigeration unit having a first variable capacity compressor and a first fixed capacity compressor;

detecting a first operating condition of said first refrigeration circuit;

comparing said first operating condition to said first set point;

staging said first variable capacity compressor and said first fixed capacity compressor based on said comparison;

selecting a second set point for a second refrigeration circuit of the commercial refrigeration system disposed at the retailer, the second refrigeration circuit including a second refrigeration case in the retail space coupled to a second refrigeration unit having a second variable capacity compressor and a second fixed capacity compressor;

detecting a second operating condition of said second refrigeration circuit;

comparing said second operating condition to said second set point; and staging said second variable capacity compressor and said second fixed capacity compressor based on said comparison.

14. The method of claim 13, wherein said detecting a first operating condition includes detecting a combined suction pressure of said first variable capacity compressor and said first fixed capacity compressor and said detecting a second operating condition includes detecting a combined suction pressure of said second variable capacity compressor and said second fixed capacity compressor.

15. The method of claim 13, wherein said comparing said first operating condition to said first set point and said comparing said second operating condition to said second set point includes using proportional integral control.

16. The method of claim 13, wherein said staging said first variable capacity compressor and said staging said second variable capacity compressor includes use of a compressor control algorithm.

17. The method of claim 13, wherein said staging said first variable capacity compressor and said staging said second variable capacity compressor includes referencing a capacity look-up table.

18. The method of claim 17, wherein said referencing includes selecting from all possible combinations of compressor staging.

19. The method of claim 13, further comprising modulating said first variable capacity compressor to achieve said first set point and modulating said second variable capacity compressor to achieve said second set point.

20. The method of claim 19, further comprising selectively toggling said first fixed capacity compressor between a run state and a shutdown state to achieve said first set point and selectively toggling said second fixed capacity compressor between a run state and a shutdown state to achieve said second set point.

21. The method of claim 13, further comprising communicating compressor staging information from said first refrigeration circuit to a system controller and communicating compressor staging information from said second refrigeration circuit to a system controller.

22. A commercial refrigeration system comprising:
a plurality of discrete refrigeration units at a retailer and respectively coupled to independent refrigeration circuits each including a refrigeration case in a retail space, each of said individual refrigeration circuits operating in a different temperature range from another of said independent refrigeration circuits;
each of said discrete refrigeration units including at least one compressor fluidly coupled to a suction manifold and fluidly coupled to a discharge manifold; and
each of said plurality of discrete refrigeration units including a controller to stage said at least one compressor based on a comparison of an operating condition of a respective said independent refrigeration circuit to a refrigeration circuit set point.

23. The system of claim 22, wherein said operating condition is a suction pressure.

24. The system of claim 23, wherein said suction pressure is detected at said suction manifolds.

25. The system of claim 23, wherein said controller compares said suction pressure to said refrigeration circuit set point to determine a compressor capacity required to achieve said refrigeration circuit set point.

26. The system of claim 25, wherein said controller uses proportional integral control in comparing said suction pressure and said refrigeration circuit set point.

27. The system of claim 25, wherein said controller selects said compressor staging based on said required compressor capacity using a compressor control algorithm.

28. The system of claim 25, wherein said controller selects said compressor staging based on said required compressor capacity using a look-up table.

29. The system of claim 28, wherein said look-up table includes all possible combinations of compressor staging.

30. The system of claim 22, wherein each of said discrete refrigeration units further includes a condensing unit having a condenser coil and a condenser fan.

31. The system of claim 30, wherein said controller is operable to control said condenser fan based on said refrigeration circuit set point.

32. The system of claim 22, wherein said controller is in communication with a system controller.

33. The system of claim 22, wherein each of said discrete refrigeration units includes at least one fixed capacity compressor.

34. The system of claim 22, wherein each of said discrete refrigeration units includes at least one variable capacity compressor.

35. The system of claim 22, wherein each of said discrete refrigeration units includes at least one fixed capacity compressor and at least one variable capacity compressor.

* * * * *